(12) United States Patent
Meade et al.

(10) Patent No.: US 10,935,739 B2
(45) Date of Patent: Mar. 2, 2021

(54) METHODS AND SYSTEMS FOR HERMETICALLY SEALED FIBER TO CHIP CONNECTIONS

(71) Applicant: Micron Technology, Inc., Boise, ID (US)

(72) Inventors: Roy Meade, Boise, ID (US); Gurtej Sandhu, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 15/714,886

(22) Filed: Sep. 25, 2017

(65) Prior Publication Data

US 2018/0024304 A1 Jan. 25, 2018

Related U.S. Application Data

(60) Continuation of application No. 15/091,439, filed on Apr. 5, 2016, now Pat. No. 9,804,350, which is a division of application No. 13/543,156, filed on Jul. 6, 2012, now Pat. No. 9,329,336.

(51) Int. Cl.
| | |
|---|---|
| *G02B 6/42* | (2006.01) |
| *G02B 6/30* | (2006.01) |
| *G02B 6/12* | (2006.01) |
| *G02B 6/25* | (2006.01) |
| *G02B 6/255* | (2006.01) |
| *G02B 6/26* | (2006.01) |

(52) U.S. Cl.
CPC ............ *G02B 6/4251* (2013.01); *G02B 6/12* (2013.01); *G02B 6/25* (2013.01); *G02B 6/255* (2013.01); *G02B 6/262* (2013.01); *G02B 6/305* (2013.01); *G02B 6/424* (2013.01)

(58) Field of Classification Search
CPC .......... G02B 6/4251; G02B 6/12; G02B 6/25; G02B 6/255; G02B 6/262; G02B 6/305; G02B 6/424
See application file for complete search history.

(56) References Cited

U.S. PATENT DOCUMENTS

| | | | |
|---|---|---|---|
| 3,788,827 | A | 1/1974 | Deluca |
| 4,652,323 | A | 3/1987 | Butt et al. |
| 4,785,805 | A | 11/1988 | Osborn et al. |
| 5,002,359 | A | 3/1991 | Sayegh et al. |

(Continued)

FOREIGN PATENT DOCUMENTS

| | | |
|---|---|---|
| CN | 101371175 A | 2/2009 |
| CN | 101533128 B | 11/2010 |

(Continued)

OTHER PUBLICATIONS

Ko et al., Low temperature bonding technology for 3D integration, Microelectronics Reliability 52 (2012) 302-311; Available online Apr. 16, 2011; available at https://ir.nctu.edu.tw/bitstream/11536/15218/1/000300190600002.pdf.dd.*

(Continued)

*Primary Examiner* — Peter Radkowski
(74) *Attorney, Agent, or Firm* — Perkins Coie LLP

(57) ABSTRACT

Disclosed are methods of providing a hermetically sealed optical connection between an optical fiber and an optical element of a chip and a photonic-integrated chip manufactured using such methods.

20 Claims, 5 Drawing Sheets

(56) References Cited

U.S. PATENT DOCUMENTS

| | | |
|---|---|---|
| 5,074,638 A | 12/1991 | Poli et al. |
| 6,043,294 A | 3/2000 | Hed et al. |
| 6,180,496 B1 | 1/2001 | Farrens et al. |
| 6,216,939 B1 | 4/2001 | Thackara et al. |
| 6,238,078 B1 | 5/2001 | Hed et al. |
| 6,355,301 B1 | 3/2002 | Miller |
| 6,486,008 B1 | 11/2002 | Lee et al. |
| 6,498,369 B1 | 12/2002 | Kitakado et al. |
| 6,576,313 B2 | 6/2003 | Ito et al. |
| 6,643,446 B2 | 11/2003 | Moidu et al. |
| 6,764,550 B2 | 7/2004 | Kang et al. |
| 7,261,793 B2 | 8/2007 | Chen et al. |
| 7,415,184 B2 | 8/2008 | Ghiron et al. |
| 7,419,884 B2 | 9/2008 | Kerdiles et al. |
| 7,572,070 B2 | 8/2009 | Sasaki et al. |
| 7,601,271 B2 | 10/2009 | Vaufredaz et al. |
| 7,611,974 B2 | 11/2009 | Letertre et al. |
| 7,781,300 B2 | 8/2010 | Moriceau et al. |
| 7,863,650 B2 | 1/2011 | Letertre et al. |
| 8,091,601 B2 | 1/2012 | Kerdiles et al. |
| 8,091,764 B2 | 1/2012 | Okada et al. |
| 8,300,312 B2 | 10/2012 | Kobayashi et al. |
| 2001/0037997 A1 | 11/2001 | Barnett et al. |
| 2002/0005574 A1 | 1/2002 | Zhou et al. |
| 2002/0072157 A1 | 6/2002 | Jinno et al. |
| 2002/0097975 A1 | 7/2002 | Delpoux et al. |
| 2002/0164489 A1 | 11/2002 | Iio et al. |
| 2002/0170496 A1 | 11/2002 | Ha et al. |
| 2002/0170877 A1 | 11/2002 | Fazio et al. |
| 2002/0176668 A1 | 11/2002 | Rubino et al. |
| 2003/0047137 A1 | 3/2003 | Kang et al. |
| 2003/0068449 A1 | 4/2003 | Steinberg et al. |
| 2003/0094443 A1 | 5/2003 | Barnett et al. |
| 2004/0058476 A1 | 3/2004 | Enquist et al. |
| 2005/0078920 A1 | 4/2005 | Lee et al. |
| 2005/0102025 A1 | 5/2005 | Laroche et al. |
| 2006/0032582 A1* | 2/2006 | Chen ............... H01L 24/83 156/272.6 |
| 2006/0033188 A1 | 2/2006 | Chen et al. |
| 2006/0240642 A1 | 10/2006 | Kerdiles et al. |
| 2007/0023850 A1 | 2/2007 | Chen et al. |
| 2007/0023904 A1 | 2/2007 | Salmon et al. |
| 2007/0119812 A1 | 5/2007 | Kerdiles et al. |
| 2007/0202660 A1 | 8/2007 | Moriceau et al. |
| 2007/0274630 A1 | 11/2007 | Ghiron et al. |
| 2008/0191239 A1 | 8/2008 | Letertre et al. |
| 2009/0017222 A1 | 1/2009 | Dornfest et al. |
| 2009/0032831 A1 | 2/2009 | Akiyama et al. |
| 2009/0081424 A1 | 3/2009 | Gomi et al. |
| 2009/0081848 A1 | 3/2009 | Erokhin et al. |
| 2009/0261064 A1 | 10/2009 | Kerdiles et al. |
| 2009/0294072 A1 | 12/2009 | Kerdiles et al. |
| 2010/0006857 A1 | 1/2010 | Letertre et al. |
| 2010/0032081 A1 | 2/2010 | Green et al. |
| 2010/0092786 A1 | 4/2010 | Utsumi et al. |
| 2010/0101719 A1 | 4/2010 | Otsuka et al. |
| 2010/0134885 A1 | 6/2010 | Kobayashi et al. |
| 2010/0155803 A1 | 6/2010 | Sandhu et al. |
| 2011/0007998 A1 | 1/2011 | Yamamoto et al. |
| 2012/0006468 A1 | 1/2012 | Stopford et al. |
| 2012/0262674 A1 | 10/2012 | Kawase et al. |

FOREIGN PATENT DOCUMENTS

| | | | | |
|---|---|---|---|---|
| EP | 515784 A2 | 12/1992 | | |
| GB | 2186992 A | 8/1987 | | |
| GB | 2381326 | 4/2003 | | |
| GB | 2381326 A | 4/2003 | | |
| JP | 05173038 A | * 7/1993 | ............... | G02B 6/30 |
| JP | 06247739 A | 9/1994 | | |
| JP | 10182851 A | 7/1998 | | |
| JP | 11337774 A | 12/1999 | | |
| JP | 2004252290 A | 9/2004 | | |
| JP | 2006222436 A | 8/2006 | | |
| JP | 2009502534 A | 1/2009 | | |
| JP | 2009145763 A | 7/2009 | | |

OTHER PUBLICATIONS

Matsuo et al., Room-temperature continuous-wave operation of lateral current injection wavelength-scale embedded active-region photonic-crystal laser, Optics Express, V. 20, N. 4, p. 3773, Feb. 13, 2012 (Year: 2012).*

Takigawa et al., Room-Temperature Bonding of Vertical-Cavity Surface-Emitting Laser Chips on Si Substrates Using Au Microbumps in Ambient Air, 2008 Appl. Phys. Express 1 112201 (Year: 2008).*

Mizumoto et al., Direct Wafer Bonding and Its Application to Waveguide Optical Isolators, Materials 2012, 5, 985-1004; doi: 10.3390/ma505985.*

Office Action dated Dec. 1, 2015 in Japan Application No. 2015-520279, 5 pages.

Anatol Khilo et al., "Efficient Planar Single Mode Fiber-to-Chip Coupler Based on Two-Stage Adiabatic Evolution", Conferences on Lasers and Electro-Optics (CLEO) and Quantum Electronics and Laser Science Conference (ELS), May 16, 2010, pp. 1-2.

Kostrzewa et al., "Die-to-Wafer molecular bonding for optical interconnects and packaging," EMPC 2005, Jun. 12-14, Brugge, Belgium, S4.01, pp. 118-123.

Office Action dated Apr. 11, 2016 in Korea Application No. 10-2015-7003074, 13 pages.

Office Action dated Apr. 5, 2017 in Chinese application No. 201380040293.X, 16 pages.

Office Action dated Sep. 25 in Taiwan Application No. 102123693, 5 pages.

Office Action dated Jan. 15, 2015 in Taiwan Application No. 102123693, 13 pages.

Written Opinion dated Jul. 27, 2015 in Singapore Application No. 11201500066R, 13 pages.

* cited by examiner

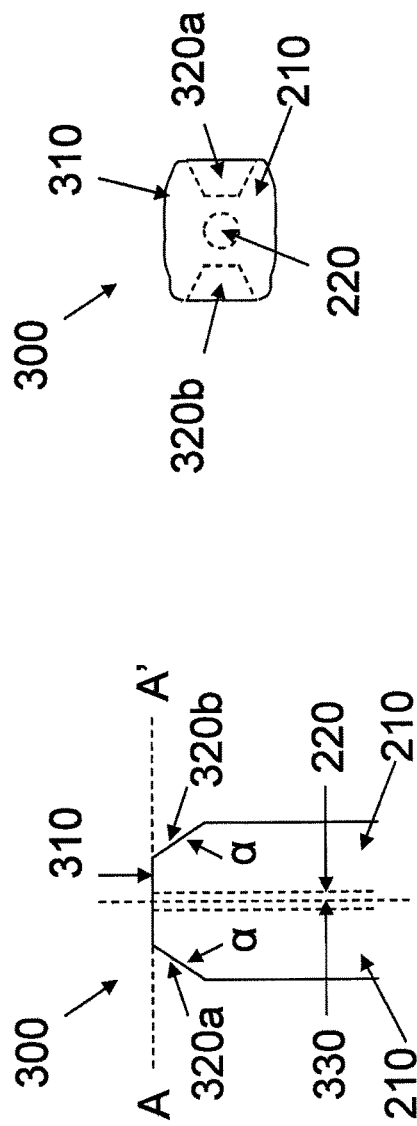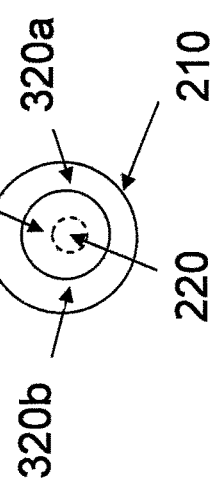
FIG. 3A
FIG. 3B
FIG. 3C

METHODS AND SYSTEMS FOR HERMETICALLY SEALED FIBER TO CHIP CONNECTIONS

CROSS-REFERENCE TO RELATED APPLICATION(S)

This application is a continuation of U.S. application Ser. No. 15/091,439, filed Apr. 5, 2016, now U.S. Pat. No. 9,804,350, which is a divisional of U.S. application Ser. No. 13/543,156, filed Jul. 6, 2012, now U.S. Pat. No. 9,329,336, each of which is incorporated herein by reference in its entirety.

TECHNICAL FIELD

Embodiments of the invention relate to optical interconnects for chip-to-chip and intra-chip communication, and specifically directed to systems and methods of forming a hermetically sealed connection between an optical fiber and a silicon based photonic-integrated-chip.

BACKGROUND

Optical transmission may be used as a means for communication between separate integrated circuit chips (inter-chip connections) and within components on the same chip (intra-chip connections). In chip-to-chip communication via optical interconnects, each chip on the circuit board is interfaced with a transmitter-receiver optoelectronic chip, and the two optoelectronic chips are connected via a planar dielectric waveguide or optic fiber. Likewise, optical waveguides may be used to connect components within a chip, such as between an integrated optical source and a detector. An integrated optical waveguide is an optical path formed on or within a dielectric substrate, e.g., oxide coated silicon substrate, using lithographic processing. The waveguide can be made of an inorganic crystal or semiconductor material having a higher index of refraction than the chip substrate to guide optical signals along the waveguide.

The coupling of a single-mode fiber to an integrated optical waveguide (and vice versa) is one of the most expensive and time-consuming manufacturing processes in the packaging of semiconductor photonics. Various solutions to the coupling problem have been proposed including using a lateral inverted taper structure or a vertical diffractive grating structure.

Another challenge is to hermetically seal the fibers or wires connected to the photonic-integrated chip because the performance of photonic elements may be adversely affected by environmental conditions such as moisture and contaminants. Therefore, environmental isolation of the photonic elements in the chip is a design challenge. FIG. 1A shows a conventional photonic integrated chip package 100 connected to an optical fiber 110 through a feedthrough 120. Feedthrough 120 provides a hermetic seal between the fiber 110 and the chip package 100. FIG. 1B shows a cross-section diagram of the hermetic fiber feedthrough 120. The feedthrough 120 encases an end stripped portion 130 of the optical fiber 110. The end stripped portion 130 of the optical fiber 110 is surrounded by a glass solder 140 material, such as lead borate glass. The glass solder 140 is stacked between a glass sleeve 150 and the fiber 110 thereby forming a bond between the fiber 110 and the glass sleeve 150 that is largely free from porosity. The glass sleeve 150 is encased by a glass solder 160 material, such as lead borate glass, which in turn is surrounded by a outer sleeve 170. The outer sleeve 170 is made from metal, metallic alloy, ceramic, or glass. The end face 180 of the hermetically sealed fiber 110 is coupled to the photonic integrated chip package 100.

The conventional method described above however is costly and does not support high volume manufacturing. There is a need for an improved method to hermetically seal an optical fiber to a photonic-integrated chip. The method needs to be low cost and provide for a hermetically sealed connection with high reliability under extreme ambient conditions. In addition, the method needs to support high volume manufacturing processes and low processing temperatures.

BRIEF DESCRIPTION OF THE DRAWINGS

FIGS. 3A and 3B are top and cross-sectional views, respectively, of an optical fiber in accordance with a disclosed embodiment;

FIG. 3C is another cross-sectional view of an optical fiber in accordance with a disclosed embodiment;

DETAILED DESCRIPTION

In the following detailed description, reference is made to the accompanying drawings which form a part hereof, and in which is shown by way of illustration specific embodiments that may be practiced. It should be understood that like reference numbers represent like elements throughout the drawings. These embodiments are described in sufficient detail to enable those skilled in the art to make and use them, and it is to be understood that structural, material, electrical, and procedural changes may be made to the specific embodiments disclosed, only some of which are discussed in detail below.

Described herein is a method of preparing an optical fiber for coupling with, for example, a photonic-integrated chip. The method includes activating an end surface of the optical fiber in a plasma to generate dangling bonds on the end surface of the optical fiber, whereby the dangling bonds facilitate coupling with a surface of the photonic-integrated chip. Also described is an optical device manufacturing process that includes the steps of pre-activating an end surface of at least one optical fiber in a plasma generated from a gas specie containing oxygen, nitrogen, argon, hydrogen or ammonia and connecting the pre-activated end surface of the at least one optical fiber to, for example, a photonic-integrated chip. The disclosed methods can be used to manufacture an integrated optical device having a hermetically sealed fiber to chip connection.

Figure 1B:
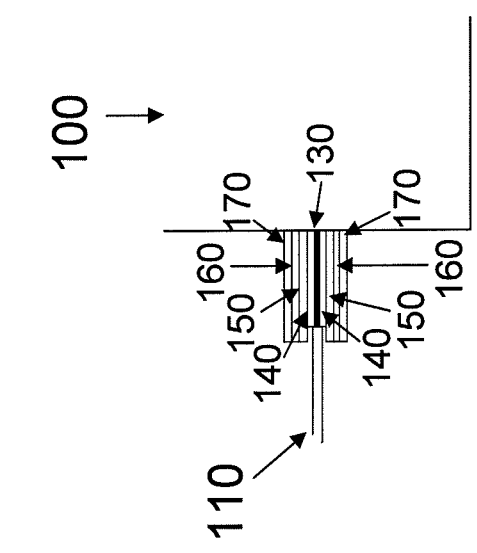
FIGS. 1A and 1B show a conventional hermetically sealed fiber to chip connection.
Figure 1A:
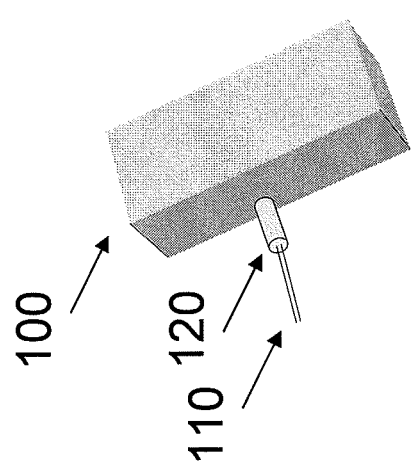
Figure 2:
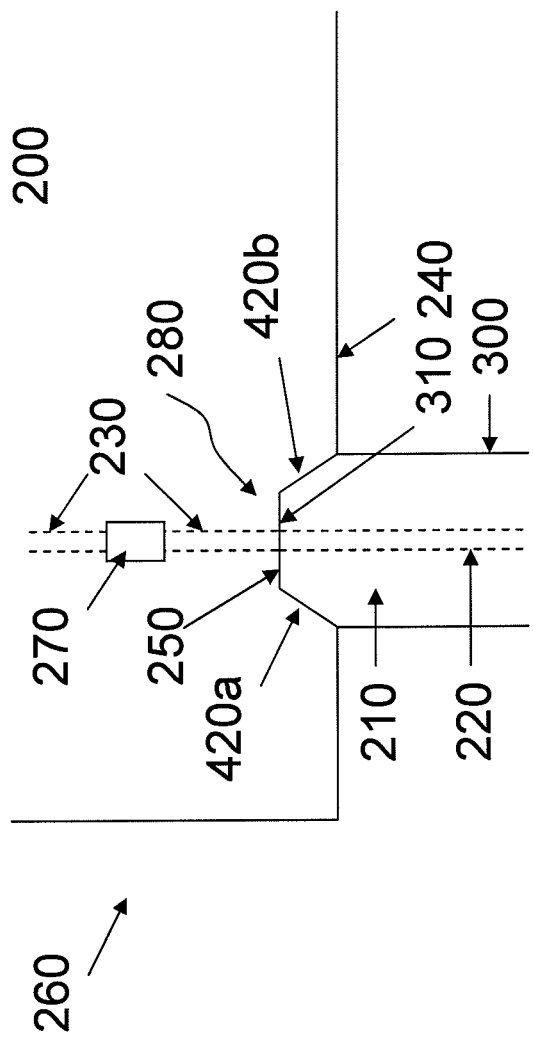
FIG. 2 is a top view of an optical device in accordance with a disclosed embodiment.

FIG. 2 is a top view of an optical device 260 in accordance with a disclosed embodiment. The optical device 260 has a photonic-integrated chip 200 coupled to an optical fiber assembly 300. The optical device 260 integrates multiple photonic functions on the photonic-integrated chip 200 using photonic elements 270 such as waveguides, optical amplifiers, modulators, filters, optical sources and detectors. The chip 200 has optical waveguides 230 that can be used to connect multiple photonic elements 270, such as between an integrated optical source and a detector, to each other. The optical waveguide 230 can also be used to connect a photonic element 270 to an optical fiber assembly 300 as shown in FIG. 2.

The optical device 260 has a hermetically sealed fiber to chip connection 250 located on a side surface 240 of the chip 200. A self-aligned mechanical interface 280 is used to help guide the fiber 300 to chip connection 250 using inverted taper coupling, although other known coupling mechanism can be utilized. As shown FIG. 2, for example, the self-aligned mechanical interface 280 located on the side surface 240 of the chip 200 is chamfered at 420a and 420b to mechanically align with a chamfered end surface 310 of the fiber assembly 300. Although FIG. 2 shows the fiber to chip connection 250 having a chamfered interface, it shall be appreciated that the fiber to chip connection 250 can be based on any suitable shape and configuration as long as the optical fiber assembly 300 can be aligned with and couple to the optical waveguide 230 on the chip 200 for optical communication.

FIG. 3A is a top view of the optical fiber assembly 300. The optical fiber assembly 300 can be a single-mode fiber having a core 220 surrounded by a cladding 210 material having a lower index of refraction than the core 220. In this embodiment, the core 220 is made of silica and germania and the cladding 210 is made of silicon dioxide. FIG. 3B shows a cross-sectional A-A' view of the optical fiber assembly 300. One end of the optical fiber assembly 300 has chamfered surfaces 320a, 320b. The chamfered surfaces 320a, 320b can have any angle a, for example, 45 degrees, measured with respect to the center axis 330 of the fiber core 220 as shown in FIG. 3A. The chamfered surfaces 320a, 320b can be annular as shown in FIG. 3C. Typically, any buffer and coating is stripped off of the end surface 310 and the chamfered surfaces 320a, 320b prior to connecting with the chip 200.

To ensure a good seal and adhesion between the fiber assembly 300 and the chip 200, the end surface 310 of the fiber assembly 300 is pre-activated in a plasma generated from oxygen or hydrogen containing gas species. Dangling bonds are generated on the end surface 310 of fiber assembly 300 when the silicon dioxide cladding 210 (FIG. 2) and silicon core 220 (FIG. 2) are activated in the plasma. The silicon atom requires four bonds to fully saturate its valence shell. In crystalline silicon, each silicon atom is bonded to four other silicon atoms. At the surface of the silicon core 220, however, the silicon atoms may have too few bonds to satisfy its valence shell. The surface 220 silicon atoms may be bonded to only three silicon atoms, leaving one unsatisfied valence bond, also known as a dangling bond. The surface of the silicon dioxide cladding 210 also has silicon atoms with unsatisfied valence bonds, or dangling bonds. In order to gain enough electrons to fill their valence, the silicon atoms with dangling bonds on the end surface 310 favor forming covalent bonds with silicon atoms that form at the side surface 240 (FIG. 2) of the optical waveguide 230 of the photonic-integrated chip 200. Pre-activation of the silicon dioxide and silicon end surface 310 in plasma to generate dangling bonds thus facilitate very robust bonding between the fiber assembly 300 and the photonic-integrated chip 200. The entire or a portion of the end surface 310 of the fiber assembly 300 can be pre-activated in the plasma The chamfered surfaces 320a, 320b can also be pre-activated ii). the plasma used to pre-activate the end surface 310 of the fiber assembly 300.

Other suitable gas species containing, for example, nitrogen, argon and ammonia, can be used to generate the plasma The plasma can be generated using any suitable process including, but not limited to, reactive ion etching plasma and microwave radicals generated from the gas species. Surface activation of the end surface 310 of the fiber assembly 300 prior to bonding the end surface 310 with the photonic-integrated chip 200 has the advantage that no intermediate layer, such as an adhesive, or step is needed to create a good seal and adhesion between the fiber assembly 300 and the chip 200.

Figure 4B:
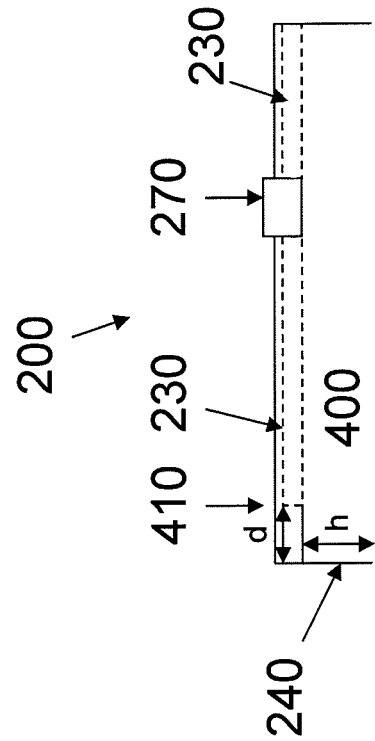
FIGS. 4A and 4B are top and cross-sectional views, respectively, of a photonic-integrated chip in accordance with a disclosed embodiment.
Figure 4A:
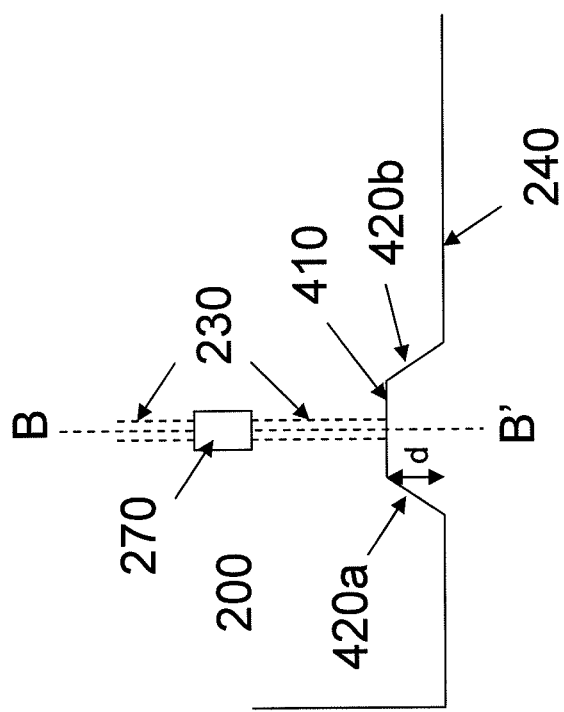

FIG. 4A is a top view of the photonic-integrated chip 200. FIG. 4B shows a cross-sectional B-B' view of the photonic-integrated chip 200. The chip 200 includes an optical waveguide 230 formed on a dielectric substrate, e.g., oxide coated silicon substrate 400. The waveguide 230 connects a photonic element 270 (e.g., optical source, detector, etc.) to another photonic element or is aligned with an optical fiber 300 to guide optical signals from the input optical fiber 300 to the photonic elements on the chip. One side 240 of the chip 200 has chamfered surfaces 420a, 420b. The chamfered surfaces 420a, 420b have angles corresponding to the angle a of the chamfered surfaces 320a, 320b (FIG. 3A) on the fiber assembly 300 such that the pre-activated end surface 310 of the fiber assembly 300 aligns and couples to the surface 410 connecting the two chamfered surfaces 420a, 420b of the chip 200. The chamfered surfaces 420a, 420b have a height d measured from the surface 410 to the side surface 240 of the chip as shown in FIG. 4A.

FIG. 4B shows the silicon substrate 400 extends below the surface 410 where the fiber 300 couples to the chip 200. However, it shall be appreciated that the fiber 300 may extend below the silicon substrate 400 in the case, for example, where the silicon substrate 400 is a composite structure having a thickness h of about 50 μm and the diameter of the single mode fiber, such as SMF-28, is 125 μm.

The pre-activated end surface 310 of the fiber 300 forms a hermetically sealed connection 250 after any conventional method of assembling and alignment of the fiber 300 to the chip 200. Although FIGS. 4A and 4B show the optical fiber assembly 300 is aligned to the chip using inverted taper coupling, it shall be appreciated that the embodiment may be modified to use vertical taper coupling or any other suitable coupling of the fiber to chip. The hermetically sealed connection 250 exhibits excellent water-repellency. Standard low temperature annealing used for chip packaging flow, for example, at a temperature of at least 200° Celsius for at least two hours, can provide further improvements in hermetically sealing the fiber assembly 300 to the chip 200.

Although a good seal can be created from only pre-activating the end surface 310 of the fiber assembly 300, the surface 410 of the chip 200 can be pre-activated in plasma from a gas species containing oxygen, hydrogen, nitrogen, argon or ammonia, such as the plasma used to pre-activate the end surface 310 of the fiber assembly 300. The dangling bonds of the pre-activated surface 410 of the chip 200 generate even stronger covalent bonds with the pre-activated end surface 310 of the fiber assembly 300. The chamfered surfaces 420a, 420b of the chip 200 can also be pre-activated using the same plasma.

Figure 5:
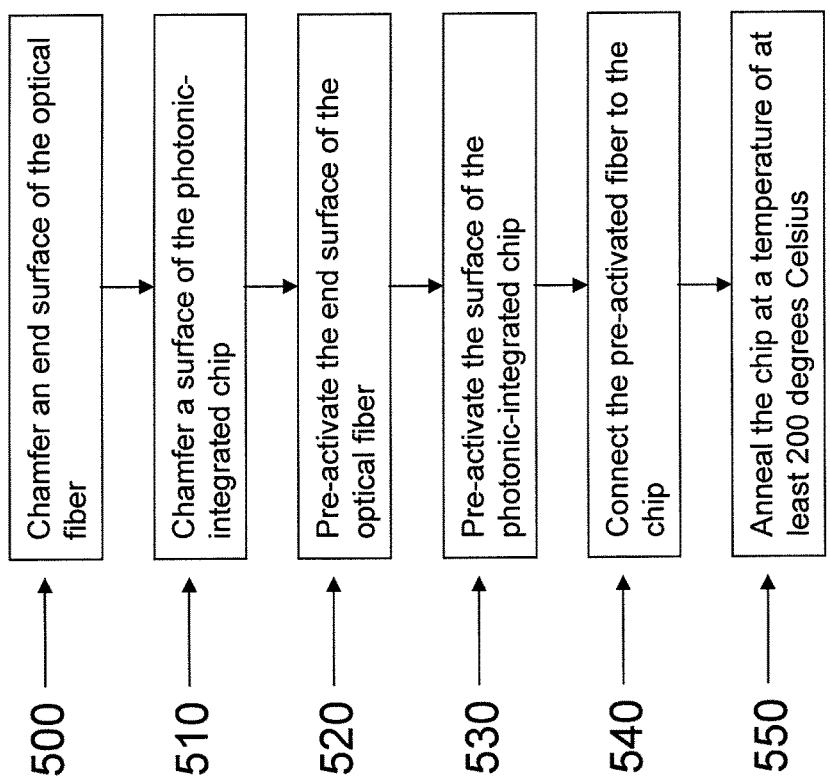
FIG. 5 is a flowchart of an integrated optical device manufacturing process in accordance with a disclosed embodiment.

FIG. 5 is a flowchart of an integrated optical device manufacturing process in accordance with a disclosed embodiment. The process shown hermetically seals at least one input optical fiber to a surface of a photonic-integrated chip. At step 500 of the process, the end surface 310 of the optical fiber 300 that will be coupled to the chip 200 is chamfered as shown in FIGS. 3A and 3B, for example. At step 510, the surface of the chip 200 that will be hermetically connected to the fiber 300 is chamfered as shown in FIGS. 4A and 4B, for example. At step 520, the end surface 310 of the fiber 300 is pre-activated in a plasma to generate dangling bonds (or free silicon bonds) on the end surface 310. If multiple fibers 300 are to be coupled to the chip 200 in batch processing, then the end surfaces 310 of the plurality of fibers 300 may be simultaneously pre-activated in the plasma. The pre-activated end surfaces 310 are connected to the corresponding surfaces 410 on the chip 200. The connection step should occur within a predetermined time, such as within two hours of the pre-activating step, to ensure the fiber remains pre-activated. To speed up the bonding process, at step 530, the surface 410 of the chip 200 may also be pre-activated in the plasma to generate dangling bonds on the surface 410 of the chip 200. The pre-activation of the chip surface 410 may occur before, after or simultaneous with the pre-activation of the fiber 300. At step 540, the pre-activated fiber 300 is connected to the chip 200 as shown in FIG. 2. Pressure at, for example, 1.5 MPa may be applied to ensure no gaps form between the fiber 300 and the chip 200. At step 550, after the fiber 300 is connected to the chip 200, the chip 200 can be annealed at a temperature of at least 200 degrees. Celsius to further augment the sealing of the fiber to the chip.

While disclosed embodiments have been described in detail, it should be readily understood that the invention is not limited to the disclosed embodiments. Rather the disclosed embodiments can be modified to incorporate any number of variations, alterations, substitutions or equivalent arrangements not heretofore described.

We claim:

1. An optical device, comprising:
    a photonic-integrated chip on which an optical waveguide is formed, the photonic-integrated chip having a flat base surface; and
    an optical fiber assembly comprising an optical fiber having a flat terminating end surface that is pre-activated in a plasma to create dangling bonds on the terminating end surface of the optical fiber which facilitate coupling with the optical waveguide;
    wherein the terminating end surface of the optical fiber directly contacts the base surface of the photonic-integrated chip, thereby providing a hermetically sealed optical connection to the optical waveguide formed in the photonic-integrated chip, and
    wherein the photonic-integrated chip includes a photonic element distinct from the optical waveguide.

2. The optical device of claim 1, wherein the plasma is a first plasma and the flat base surface is pre-activated in a second plasma.

3. The optical device of claim 2, wherein the first plasma and the second plasma are a same plasma.

4. The optical device of claim 1, wherein a portion of the end surface surrounding the terminating end surface of the optical fiber is tapered and the tapered portion of the end surface of the optical fiber aligns with a corresponding tapered surface surrounding the base surface of the photonic-integrated chip.

5. The optical device of claim 4, wherein the tapered portion of the end surface of the optical fiber is pre-activated in the plasma.

6. The optical device of claim 4, wherein the plasma is a first plasma, and wherein the corresponding tapered surface of the photonic-integrated chip is pre-activated in a second plasma.

7. The optical device of claim 1, wherein the terminating end surface of the optical fiber is coupled to the base surface of the chip such that there are no gaps between the optical fiber and the chip.

8. The optical device of claim 1, wherein the plasma is generated from a gas species containing at least one of: oxygen, hydrogen, nitrogen, ammonia, and argon.

9. The optical device of claim 1, wherein the optical fiber forms at least one covalent bond directly with the optical waveguide.

10. The optical device of claim 9, wherein the at least one covalent bond is a silicon-to-silicon covalent bond.

11. An optical device, comprising:
    a photonic-integrated chip on which an optical waveguide is formed, the photonic-integrated chip having a flat base surface; and
    an optical fiber assembly comprising an optical fiber having a flat terminating end surface that is pre-activated in a plasma to create dangling bonds on the terminating end surface of the optical fiber which facilitate coupling with the optical waveguide;
    wherein the terminating end surface of the optical fiber directly contacts the base surface of the photonic-integrated chip, thereby providing a hermetically sealed optical connection to the optical waveguide formed in the photonic-integrated chip, and
    wherein the dangling bonds form at least one covalent bond directly with the optical waveguide of the photonic-integrated chip.

12. The optical device of claim 11, wherein the plasma is a first plasma and the flat base surface is pre-activated in a second plasma.

13. The optical device of claim 12, wherein the first plasma and the second plasma are a same plasma.

14. The optical device of claim 11, wherein a portion of the end surface surrounding the terminating end surface of the optical fiber is tapered and the tapered portion of the end surface of the optical fiber aligns with a corresponding tapered surface surrounding the base surface of the photonic-integrated chip.

15. The optical device of claim 14, wherein the tapered portion of the end surface of the optical fiber is pre-activated in the plasma.

16. The optical device of claim 14, wherein the plasma is a first plasma, and wherein the corresponding tapered surface of the photonic-integrated chip is pre-activated in a second plasma.

17. The optical device of claim 11, wherein the terminating end surface of the optical fiber is coupled to the base surface of the chip such that there are no gaps between the optical fiber and the chip.

18. The optical device of claim 11, wherein the plasma is generated from a gas species containing at least one of: oxygen, hydrogen, nitrogen, ammonia, and argon.

19. The optical device of claim 11, wherein the at least one covalent bond is a silicon-to-silicon covalent bond.

20. The optical device of claim 11, wherein the photonic-integrated chip includes a photonic element distinct from the optical waveguide.

* * * * *